(12) United States Patent
Wolfson et al.

(10) Patent No.: US 10,855,709 B2
(45) Date of Patent: Dec. 1, 2020

(54) TRACING MECHANISM FOR MONITORING AND ANALYSIS OF CLOUD-BASED COMMUNICATION SESSION ATTACKS

(71) Applicant: EMC IP Holding Company LLC, Hopkinton, MA (US)

(72) Inventors: Kfir Wolfson, Beer Sheva (IL); Jehuda Shemer, Kfar Saba (IL); Aviram Fireberger, Mavki'im (IL); Amos Zamir, Beer Sheva (IL); Oron Golan, Meitar (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 191 days.

(21) Appl. No.: 16/039,503

(22) Filed: Jul. 19, 2018

(65) Prior Publication Data
US 2020/0028863 A1 Jan. 23, 2020

(51) Int. Cl.
*H04L 29/06* (2006.01)
(52) U.S. Cl.
CPC ...... *H04L 63/1425* (2013.01); *H04L 63/1416* (2013.01); *H04L 63/1441* (2013.01)
(58) Field of Classification Search
None
See application file for complete search history.

(56) References Cited
U.S. PATENT DOCUMENTS

2016/0173529 A1* 6/2016 Baig ............... H04L 63/0236
726/13

OTHER PUBLICATIONS

Lanjuan Yang, "Defense of DDoS attack for cloud computing", 2012 IEEE International Conference on Computer Science and Automation Engineering (CSAE), pp. 1-9. (Year: 2012).*
Wenjie Lin, "Traceback Attacks in Cloud-Pebbletrace Botnet", 2012 International Conference on Distributed Computing Systems Workshops, pp. 1-21. (Year: 2012).*
https://www.darkreading.com/cloud/where-to-find-security-holes-in-serverless-architecture/d/d-id/1330842.
https://www.zdnet.com/article/the-top-10-risks-for-apps-on-serverless-architectures/.
https://read.acloud.guru/security-and-serverless-ec52817385c4.
https://securityboulevard.com/2018/07/serverless-computing-security-risks/.

* cited by examiner

*Primary Examiner* — Benjamin E Lanier
(74) *Attorney, Agent, or Firm* — Ryan, Mason & Lewis, LLP

(57) ABSTRACT

A tracing mechanism is provided for analyzing session-based attacks. An exemplary method comprises: detecting a potential attack associated with a session from a potential attacker based on predefined anomaly detection criteria; adding a tracing flag identifier to a response packet; sending a notification to a cloud provider of the potential attack, wherein the notification comprises the tracing flag identifier; and sending the response packet to the potential attacker, wherein, in response to receiving the response packet with the tracing flag identifier, the cloud provider: determines a source of the potential attack based on a destination of the response packet; forwards the response packet to the potential attacker based on the destination of the response packet; and monitors the determined source to evaluate the potential attack. The response packet is optionally delayed by a predefined time duration and/or until the cloud provider has acknowledged receipt of the notification.

20 Claims, 7 Drawing Sheets

```
HTTP/1.1 200 OK
DATE: SAT, 09 OCT 2017 14:28:02 GMT
SERVER: APACHE
LAST-MODIFIED: TUE, 01 DEC 2016 20:18:22 GMT
ACCEPT-RANGES: BYTES
CONTENT-LENGTH: 29767
CONTENT-TYPE: TEXT/HTML
RESPONSE-TAG: "51142AB27449ABCD"    ─ 510
...
(BODY)
```

TRACING MECHANISM FOR MONITORING AND ANALYSIS OF CLOUD-BASED COMMUNICATION SESSION ATTACKS

FIELD

The field relates generally to the monitoring and detection of cyberattacks.

BACKGROUND

In the field of cyber security, cyberattacks are malicious actions by an attacker that target, for example, enterprise computer systems, computer networks, or personal computer devices of an attackee. Typically, one of the first steps in countering and/or investigating a cyberattack is determining the source Internet Protocol (IP) address of the attacker. With this knowledge, a Security Operations Center, such as a Cyber Security Incident Response Team, can block, divert and/or prevent the attack, and the source IP address can often be used to help identify the attacker.

Attackers, in response, use cloud providers and/or a frequent change of IP addresses to be less vulnerable to detection. For example, Function as a Service (FaaS) platforms have been used by attackers to launch cyberattacks. Such FaaS-based attacks are problematic with existing network analysis tools as the function is active (e.g., alive) for only a short period of time (e.g., on a container or virtual machine) before the function terminates. The transient function leaves little, if any, trace information after the function terminates. Thus, IP address tracking following such attacks typically does not provide significant information that can be used to identify the attacker, as the IP address is no longer associated with the attacker and has likely been reused by other legitimate functions.

A need therefore exists for improved techniques for analyzing cloud-based communication session attacks, such as FaaS-based attacks.

SUMMARY

Illustrative embodiments of the present disclosure provide a tracing mechanism for analyzing session-based attacks. In one embodiment, an exemplary method comprises: detecting a potential attack associated with a session from a potential attacker based on one or more predefined anomaly detection criteria; adding a tracing flag identifier to at least one response packet; sending a notification to at least one cloud provider of the potential attack, wherein the notification comprises the tracing flag identifier; and sending the at least one response packet to the potential attacker, wherein, in response to receiving the at least one response packet with the tracing flag identifier, the at least one cloud provider performs the following steps: determine a source of the potential attack based on a destination of the at least one response packet; forward the at least one response packet to the potential attacker based on the destination of the at least one response packet; and monitor the determined source to evaluate the potential attack.

In some embodiments, a potential source of the potential attack is identified using a list of suspected Internet Protocol addresses, and/or a cloud provider associated with the potential attack is identified based on an originating Internet Protocol address of the session. The sending the response packet to the potential attacker is optionally delayed by a predefined time duration and/or until the cloud provider has acknowledged receipt of the notification.

Other illustrative embodiments include, without limitation, apparatus, systems, methods and computer program products comprising processor-readable storage media.

BRIEF DESCRIPTION OF THE DRAWINGS

FIG. 5 illustrates an exemplary response with a tracing flag identifier, according to at least one embodiment;

DETAILED DESCRIPTION

Figure 1:
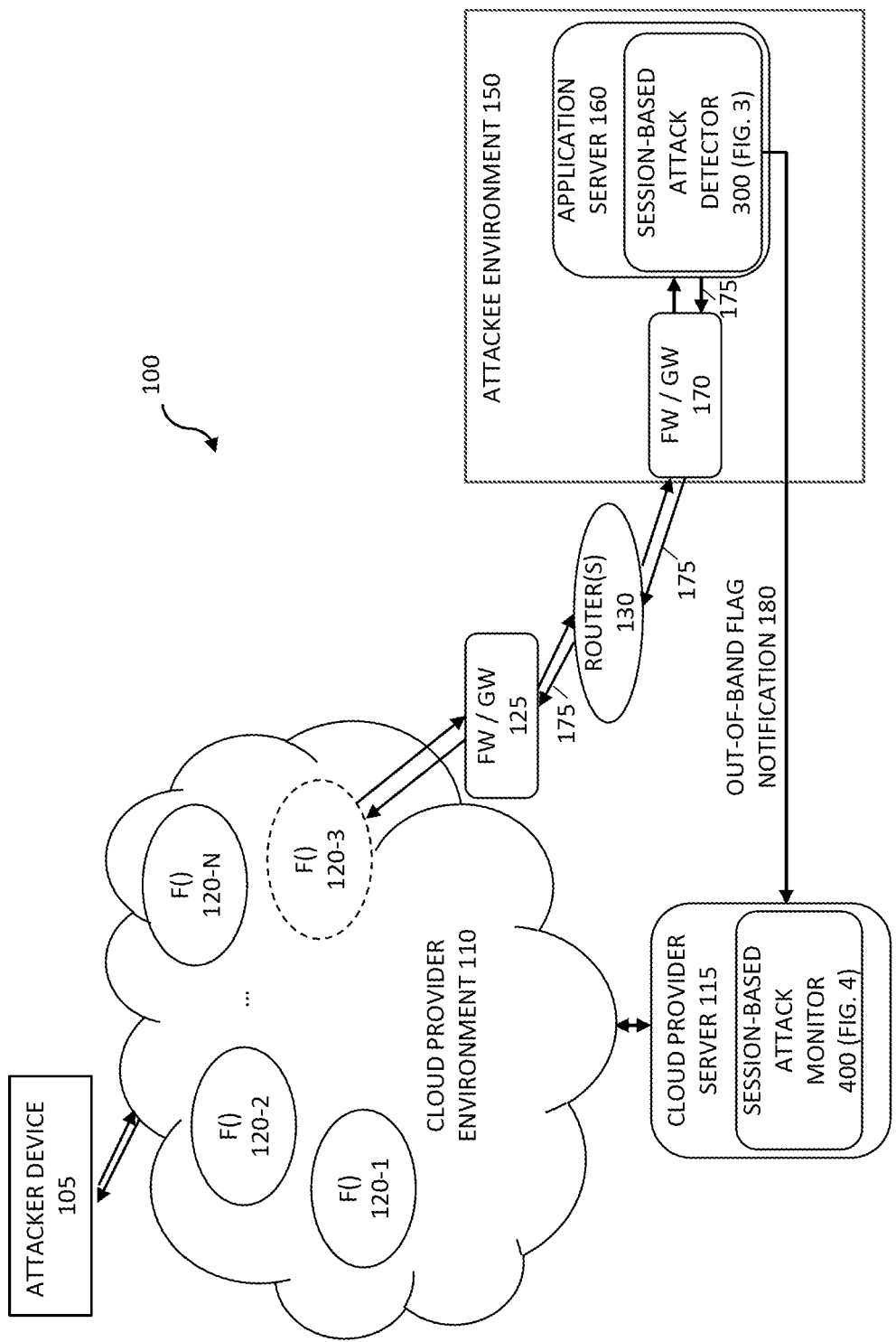
FIGS. 1 and 2 illustrate alternative implementations of an exemplary session-based attack processing system, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products that use a tracing mechanism to flag and analyze communication session attacks, such as FaaS-based attacks.

One or more embodiments of the disclosure provide a tracing mechanism that can be used to notify a cloud provider of a potential attack, so that the cloud provider can trace and identify the source of the potential attack in real time. In some embodiments, the disclosed tracing mechanism can be used to trace and identify the source of the potential attack even when FaaS is used to launch the potential attack.

In at least one embodiment, when the cloud provider is notified of a potential attack using the disclosed tracing mechanism, the cloud provider can initiate session monitoring and forensic analysis during a session associated with the potential attack, in order to detect the account, source application and/or other information associated with the session that may help to identify the attacker or to mitigate the attack.

Security Centers

Many organizations employ internal or external Cyber Security Incident Response Teams (CSIRT) to detect, monitor and respond to security threats. Security Operations Centers (SOCs), for example, use access control, monitoring and alerts to detect, avoid and defend against attacks. SOCs use a wide variety of known measures to actively find security breaches or weaknesses and overcome them.

One of the tasks of an SOC is to detect intrusions and to find information about an attacker (e.g., the source IP (Internet Protocol) address of the attacker) in order to stop, divert or otherwise mitigate the attack, and also to investigate the attacker. The source IP address of the attacker is often used to accumulate additional data about the attacker around the source IP address.

Serverless Computing

Serverless computing is an evolving computing paradigm available from a number of cloud providers. Serverless computing allows a small program or function to be executed without having to define any server or infrastructure. Provided as a service, serverless computing is often referred to as FaaS.

FaaS is a category of cloud computing services that provides a platform allowing customers to develop, run, and manage application functionalities without the complexity of building and maintaining the infrastructure typically associated with developing and launching an application.

The function typically has limitations on the maximum time that the function runs and on the resources that can be used by the function, such as memory and central processing unit (CPU) resources. There is typically no storage associated with the function execution.

The typical life cycle of a function in a FaaS environment is as follows:

1. user uploads the function program (for example, programmed in Python or Java) to the FaaS provider;
2. user sets a predefined trigger to execute the function, such as a cloud event or a data object change;
3. when the trigger occurs, the cloud provider allocates the needed resources in a set of running servers (or creates one or more new running servers) and executes the function on an allocated server; and
4. when the function finishes, the instance of the function is destroyed and the resources are freed.

If any of the predefined function limits (especially execution time) associated with a function are surpassed during the run-time of the function, the function is terminated by the FaaS provider. Users are typically billed per invocation, for example, based on the resources used by the execution of the function.

The lifetime of a function instance is typically a few seconds and can be as short as a small fraction of a second. Resources and IP addresses, for example, are typically frequently recycled across many function instances, possibly from many applications or users.

Functions deployed using FaaS can perform various cyberattacks and then simply terminate immediately. In such a scenario, SOCs typically have little, if any, significant information to forensically analyze in order to block and contain such attacks, as the source IP address of the attacker will typically be a temporary IP address from the cloud provider range.

As many millions of functions can run every second on the FaaS platform of a given cloud provider, saving meticulous logs of every run is impractical, and would likely provide a significant overhead. Thus, the cloud provider usually keeps a record of the function executions in the form of a counter for billing and reporting, but does not have a lookup function for which source IP address was used by each function.

Another problem, as noted above, is that many functions can use the same public IP address out of the cloud provider to the attackee, making it even harder to track down the attacker.

In addition, modern applications use FaaS for legitimate traffic. Attackers can add functions of their own coming from the same origin, by using the same cloud provider or even obtaining credentials and utilizing the same cloud account. Once an attack happens, it is often difficult, if not impossible, for the attackee to block attack traffic while continuing to serve legitimate incoming requests, potentially leading to a downtime of the service.

The above problems relate to the attackee being either on-premise or in a public or private cloud. The attacker can also run on a public cloud, private cloud or on FaaS services, although a public cloud implementation may be more common.

Classes of Attacks

In a flooding attack, the attacker typically sends a large number of requests, usually from multiple sources to the target of the attack. For example, in a Distributed Denial of Service (DDoS) attack, the attack is often aimed at draining the resources of the target. One category of a DDoS attach is an Application Layer Attack, which sends data according to specific features of well-known applications, such as HTTP (Hyper Text Transfer Protocol), DNS (Domain Name Service), and SMTP (Simple Mail Transfer Protocol) applications, and are often comprised of legitimate packets. In an HTTP environment, for example, slow POST and GET flood attacks are often implemented, in a known manner.

A targeted attack is one form of an Application Layer Attack, and comprises a specific malicious vector of attack, usually exploiting a weakness (e.g., a software bug) or piggybacking (or tailgating) on a legitimate resource, in a known manner. These targeted attacks can be detected, for example, by looking for patterns of access, command sequences or defenses that trigger alerts for use of specific resources.

Generally, one or more embodiments of the disclosure can be applied to detect session-based attacks, where a session is established between the attacker and the attackee, and where the session includes an exchange of several packets (e.g., TCP (Transmission Control Protocol) packets) between a client and server, such as cloud-based communication session attacks and FaaS-based attacks.

Tracing Mechanism for Analyzing Short-Lived Session-Based Attacks

To tackle the problems of a short-lived attacker, one or more embodiments of the disclosure recognize that attacks use HTTP and TCP sessions and the disclosed session-based attack detector is assumed to have control of one side of the session (e.g., the recipient side). In some embodiments, the HTTP/TCP response is delayed and a tracing flag identifier is inserted into the response as "special data." These actions will assist in pinpointing the suspected attacking process, as discussed hereinafter.

FIG. 1 illustrates an exemplary session-based attack processing system 100 that uses a tracing mechanism, according to one aspect of the disclosure. In the example of FIG. 1, FaaS provided by a cloud provider in a cloud provider environment 110 is used to launch a potential attack from an attacker device 105. A number of exemplary functions (F( )) 120-1 through 120-N are deployed using FaaS in the exemplary cloud provider environment 110.

In the example of FIG. 1, a particular function 120-3, shown with a dashed outline, is attempting to perform a cyberattack against an attackee associated with an exemplary attackee environment 150 (e.g., a machine under attack). The communications between the particular function 120-3 and the attackee environment 150 traverse a firewall/gateway 125 associated with the cloud provider environment 110, one or more routers 130, for example, that are part of a public network, such as the Internet a firewall/gateway 170 associated with the attackee environment 150.

Although the firewall/gateway devices 125 and 170 are shown as integrated devices that perform both a firewall function and a gateway function, the firewall and gateway functions can be performed by distinct devices, or a particular firewall/gateway device 125 and 170 can perform only one of the firewall and gateway functions, as would be apparent to a person of ordinary skill in the art.

In addition, in further variations, the disclosed session-based attack detection techniques can be employed in a perimeter defense system, or have traffic redirected by means of a third party providing, for example, an "identify, trap & tag" traffic functionality.

The attackee environment 150 comprises one or more application servers 160 that may be the target of the potential session-based attack from the attacker device 105 (e.g., an example of a trigger for creating the potentially malicious functions). In the embodiment of FIG. 1, the disclosed tracing mechanism functionality for analyzing session-based attacks is performed by the exemplary application server 160, using a session-based attack detector 300, as discussed further below in conjunction with FIG. 3.

Among other functions, the exemplary session-based attack detector 300 employs predefined anomaly detection criteria to detect a potential attack associated with a session from a potential attacker, such as the attacker device 105. As discussed further below, when a potential attack is detected, the exemplary session-based attack detector 300 implements the disclosed tracing mechanism to notify the cloud provider associated with the cloud provider environment 110 of the potential attack. As shown in FIG. 1, the exemplary session-based attack detector 300 responds to the particular function 120-3 with one or more response packet(s) 175 that include a flag in accordance with the disclosed tracing mechanism. The flag in the one or more response packet(s) 175 provides a notification to the cloud provider of the potential attack.

In addition, as shown in FIG. 1, the exemplary session-based attack detector 300 provides an out-of-band flag notification 180 of the potential attack to a cloud provider server 115 associated with the cloud provider environment 110. The out-of-band flag notification 180 may be communicated to the cloud provider server 115, for example, using an application programming interface (API) for cyber cooperation.

The exemplary cloud provider server 115 comprises a session-based attack monitor 400, as discussed further below in conjunction with FIG. 4, to implement the disclosed tracing mechanism functionality of the cloud provider for monitoring and analyzing session-based attacks. In at least one embodiment, when the cloud provider is notified of a potential attack using the disclosed tracing mechanism, the cloud provider initiates session monitoring and forensic analysis during a session associated with the potential attack, in order to detect, for example, the account, source application and/or other information associated with the session that may help to identify the attacker. For example, the firewall/gateway 125 of the cloud provider may search for the tracing flag identifier and trigger a dedicated action upon detection. In this manner, the cloud provider can trace and identify the source of the potential attack in real time.

It is noted that, in some embodiments, the cloud provider should not assume that every traced connection is a confirmed malicious attack. Rather, the disclosed tracing mechanism is providing a mechanism for notifying the cloud provider of potential or suspected session-based attacks. The cloud provider can then optionally gather evidence from the session until there is enough information, for example, based on one or more predefined policies, to determine that a given potential attack is actionable.

Figure 2:
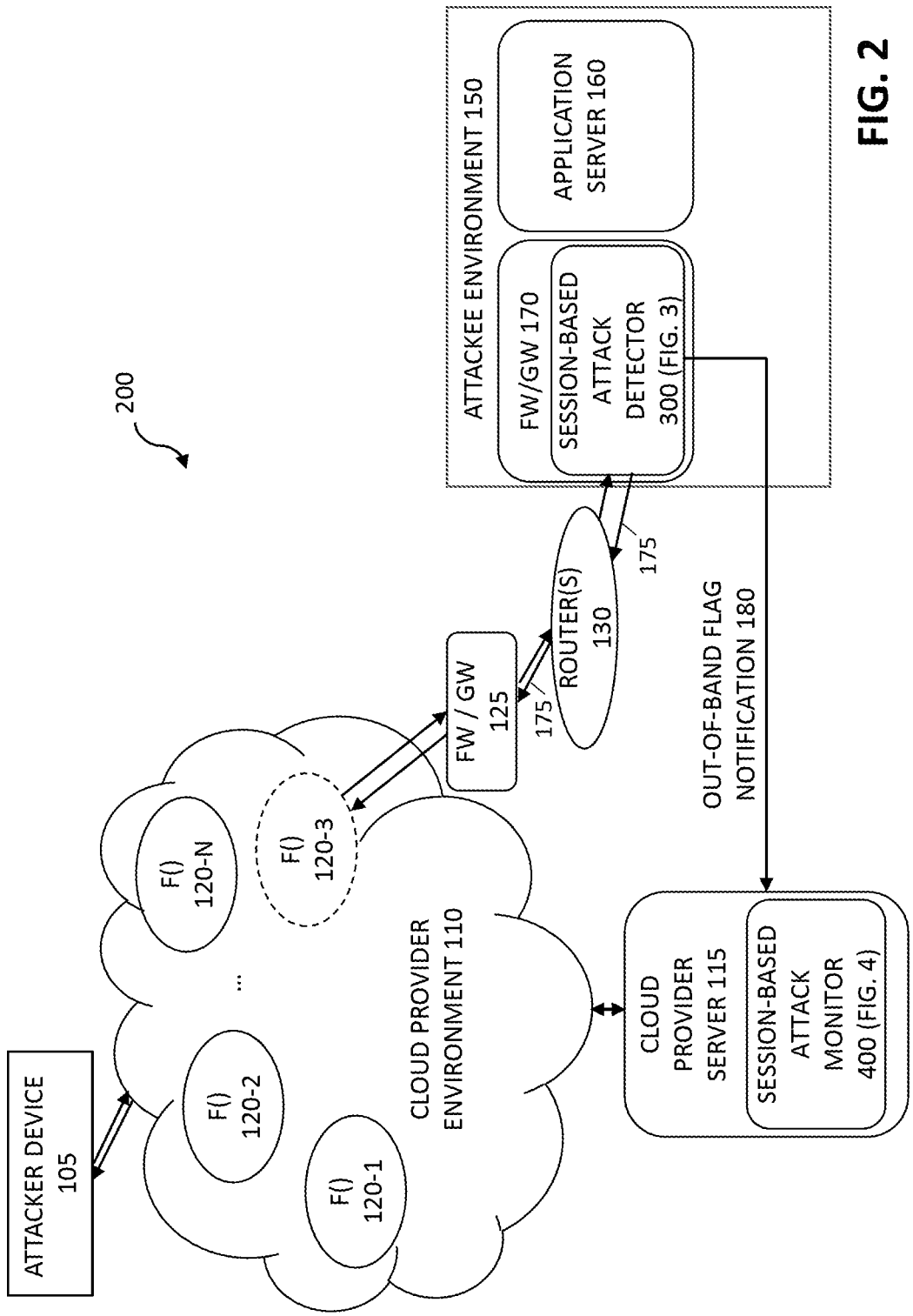

FIG. 2 illustrates an exemplary alternate implementation of a session-based attack processing system 200 that uses a tracing mechanism, according to one aspect of the disclosure. Generally, the session-based attack processing system 200 is based on the session-based attack processing system 100 of FIG. 1, where like-numbered elements implement substantially similar functions.

In the example of FIG. 2, however, the disclosed tracing mechanism functionality for analyzing session-based attacks is performed by the exemplary firewall/gateway module 170 (rather than the application server 160, as in FIG. 1). Thus, as shown in FIG. 2, the exemplary session-based attack detector 300, discussed further below in conjunction with FIG. 3, is part of the firewall/gateway module 170 in FIG. 2.

Generally, when a potential attack is detected, the exemplary session-based attack detector 300 implements the disclosed tracing mechanism to notify the cloud provider associated with the cloud provider environment 110 of the potential attack, in a similar manner as discussed above in conjunction with FIG. 1. The exemplary session-based attack detector 300 responds to the particular function 120-3 with one or more response packet(s) 175 that include a flag in accordance with the disclosed tracing mechanism. In addition, as shown in FIG. 2, the exemplary session-based attack detector 300 provides an out-of-band flag notification 180 of the potential attack to a cloud provider server 115 associated with the cloud provider environment 110.

While one or more embodiments described herein are presented in the context of attackers running multiple FaaS functions, the disclosed session-based attack detection techniques can be employed for any type of runtime compute environment, such as containers, virtual machines and physical servers, as discussed further below, as would be apparent to a person of ordinary skill in the art.

Figure 3:
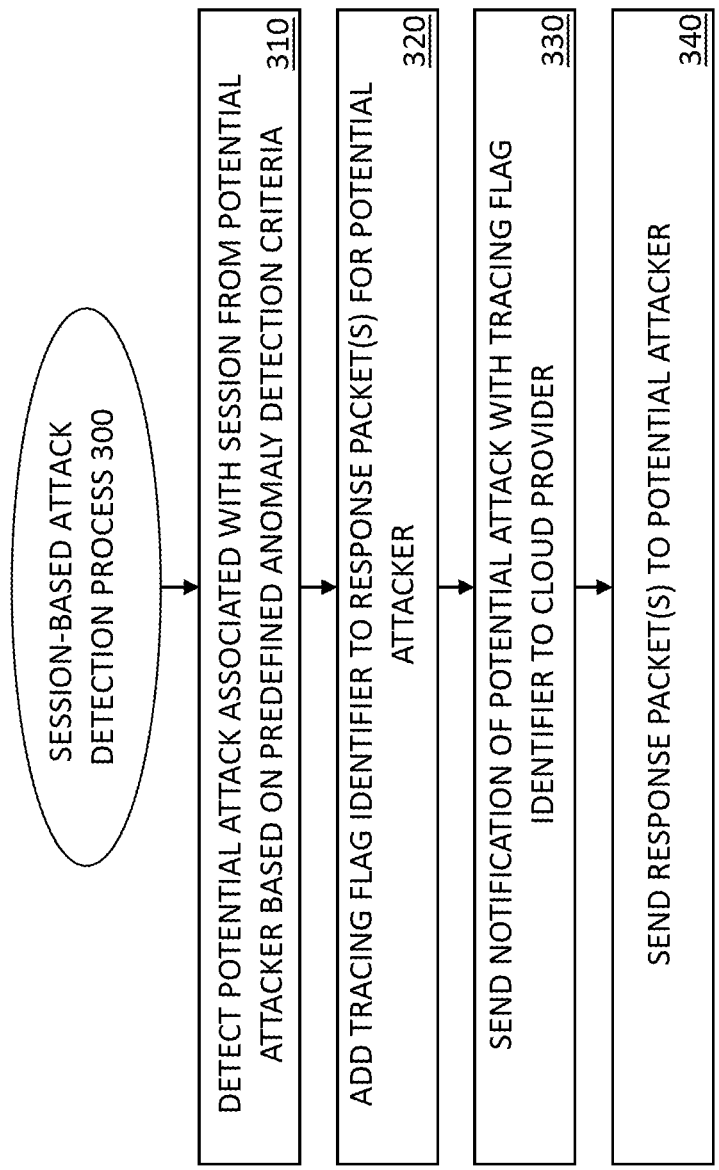
FIG. 3 is a flow chart illustrating an exemplary implementation of a session-based attack detection process, according to an embodiment.

FIG. 3 is a flow chart illustrating an exemplary implementation of a session-based attack detection process 300, according to an embodiment of the disclosure. As shown in FIG. 3, the exemplary session-based attack detection process 300 initially detects a potential attack associated with a session from a potential attacker during step 310, for example, based on predefined anomaly detection criteria (e.g., using commercially available tools and services for detecting possible cyberattacks in real time, according to incoming traffic).

In addition, the exemplary session-based attack detection process 300 optionally identifies a potential source of the potential attack using a list of suspected IP addresses. Existing attacks detection tools and services generate alerts that can be analyzed and investigated by the CSIRT and managed by the SOC. An automated or manual response by the CSIRT can trigger operations based on the incoming suspected attack. For example, in some embodiments, the CSIRT can mitigate any additional damage by performing one or more the following exemplary steps:

1. switch to one or more alternative sites or networks using DNS (domain name service) or another mechanism;
2. distribute attack traffic across a network of data centers; and
3. route traffic on scrubbing services and products.

A list of suspected "bad" IP addresses is optionally compiled from attack-originating addresses. The CSIRT can also trace proxy addresses to identify the source IP, where possible.

During step 320, the exemplary session-based attack detection process 300 adds a tracing flag identifier to one or more response packet(s) for the potential attacker. Exemplary tracing flag identifiers are discussed further below in conjunction with FIG. 5.

The exemplary session-based attack detection process 300 then sends a notification with the tracing flag identifier to one or more cloud providers during step 330, notifying the cloud provider of the potential attack. As noted above, the notification may be communicated to the cloud provider server 115, for example, using an application programming interface (API) for cyber cooperation. An exemplary API is discussed further below in a section entitled "Cyber Cooperation API."

Optionally, the session-based attack detection process 300 can identify one or more cloud providers associated with the potential attack based on an originating IP address of the session, and limit the notification during step 330 to only the identified cloud providers. The cloud providers can be identified, for example, according to known published IP address ranges for each provider. Alternatively, the notification during step 330 can be sent to all cloud providers, and each provider can filter out the irrelevant addresses.

Finally, the exemplary session-based attack detection process 300 sends the response packet(s) (e.g., HTTP/TCP responses) to the potential attacker during step 340. The sending of the response packet(s) is optionally delayed, for example, by a predefined time duration and/or until the cloud provider has acknowledged receipt of the notification. It is noted that the delay and flag injection do not have to be applied to all incoming requests. In some embodiments, delaying and injecting the tracing mechanism flag into a fraction of the requests is sufficient (e.g., enough requests for the cloud provider to capture and detect the culprit cloud accounts).

The delay and injection of data packets do not have to be fixed or decided upon for each packet independently. They can be done according to a certain pattern. The pattern can be communicated to the cloud provider via the API, so the cloud provider will be able to anticipate the delays and more importantly the injected tracing flag identifier 510 to search for without specific calls upon each suspected packet.

Generally, the responses are delayed in some embodiments to extend sessions so that the disclosed tracing mechanism can notify the cloud provider and the cloud provider can initiate monitoring, logging and/or analysis. The usual sub-second runtime of a FaaS function depends on the network operations performed by the function and a delay (e.g., a few seconds) is added, which could be a typical delay in IP networks, especially for remote locations and in cases where the server is busy. On one hand, as this is a typical delay, the suspected culprit will have a hard time detecting that the delay is intentional. On the other hand, if the traffic turns out to be legitimate, the small delay does not significantly hinder the application (e.g., only increasing the latency by a few seconds temporarily).

Figure 4:
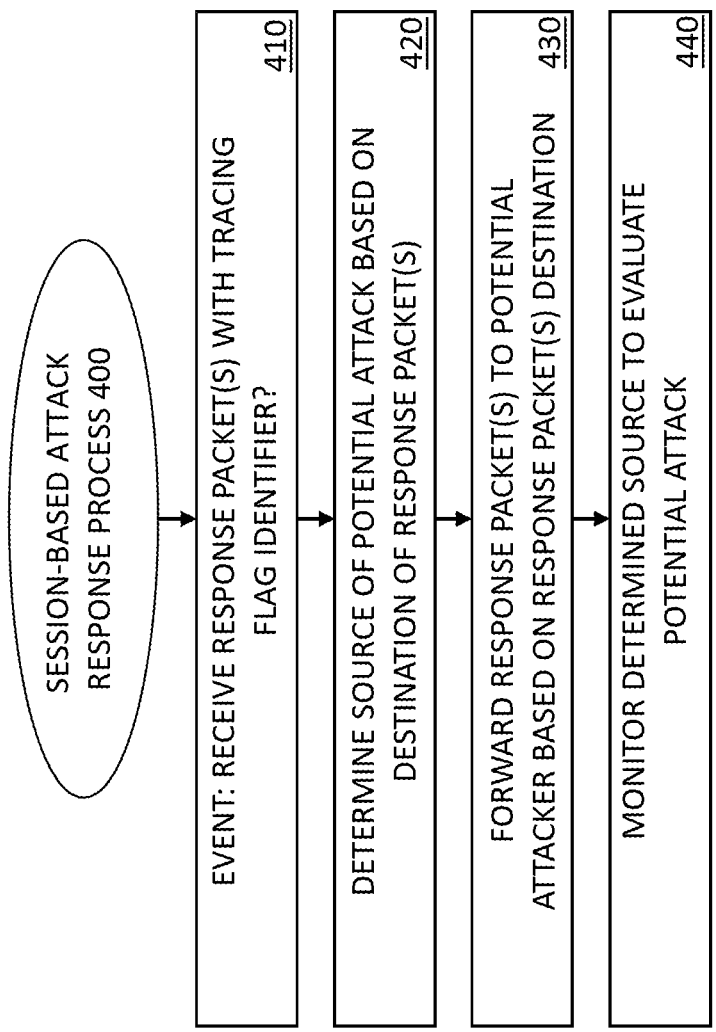
FIG. 4 is a flow chart illustrating an exemplary implementation of a cloud provider session-based attack response process, according to one embodiment of the disclosure.

FIG. 4 is a flow chart illustrating an exemplary implementation of a cloud provider session-based attack response process 400, according to one embodiment of the disclosure. As shown in FIG. 4, the exemplary session-based attack response process 400 initially waits for an event during step 410, which is triggered when one or more response packet(s) are received with the tracing flag identifier that was previously sent to the cloud provider as part of a notification. Thereafter, during step 420, the session-based attack response process 400 determines the source of the potential attack based on a destination of the response packet(s).

For example, in some embodiments, when a packet is detected with a tracing flag identifier, the cloud provider will parse the tracing flag identifier; use a lookup database to find an associated session ID and attackee information; and identify the source of the potential attack, according to the destination of the packet.

During step 430, the exemplary session-based attack response process 400 forwards the response packet(s) to the potential attacker based on the destination of the response packet(s). In some embodiments, the response packet(s) are forwarded to the potential attacker destination after optionally removing the tracing flag identifier from the response packet(s). In this manner, the potential attacker will not learn that the potential attack has been exposed and that the potential attacker is being monitored.

The exemplary session-based attack response process 400 monitors the determined source during step 440 to evaluate the potential attack. For example, the cloud provider can notify the cloud provider SOC to start monitoring and assessing the possible threat.

The cloud provider can optionally perform one or more predefined mitigation actions for a detected attack. Mitigation actions for identified attacks can optionally be negotiated or requested in advance, for example, as part of the API notification in step 330. For example, the attackee can request that the cloud provider will treat the traffic as attacks if there are more than 1000 requests per minute of the same attack type ID.

The actual mitigation actions performed by the cloud provider will depend on the cloud provider and/or one or more policies. The mitigation actions can vary between trying to contact the account/application owner, temporarily blocking the running components and new functions from sending traffic to the attackee environment 150, blocking new instantiations of the FaaS functions, and more.

The next steps may depend on a number of factors, such as the amount of suspected attack traffic, the attack type, the application status (e.g., many attacks degrade application performance and response time), and the cloud provider SOC features.

The cloud provider might come to a conclusion that a session that was flagged as a potential attack is, in fact, legitimate. The cloud provider can optionally notify the attackee environment 150 of the determination that the session was legitimate. In response, the attackee environment 150 can optionally remove the alarms, stop adding delays and/or stop adding the tracing flag identifier into additional packets. The source of the legitimate traffic may have experienced some delays as part of the delaying systems of the disclosed tracing mechanism, but the application is expected to stabilize and return to normal once the system is no longer suspecting an attack.

FIG. 5 illustrates an exemplary HTTP response 500 with a tracing flag identifier 510, according to at least one embodiment. As shown in FIG. 5, the exemplary HTTP response 500 comprises a number of standard fields and includes an exemplary "response-tag" field that carries the tracing flag identifier 510 in some embodiments. In the example of FIG. 5, the tracing flag identifier 510 is set to a random value, such as, for example, 51142ab27449abcd. Thus, the inserted tracing flag identifier 510 can be relatively small (e.g., 8 bytes long), in order to substantially minimize the overhead of this addition.

As noted above, the tracing flag identifier 510 added to the exemplary HTTP response 500 (or a TCP response) will basically flag these response messages to the cloud provider and highlight them for easier processing in the flood of incoming packets. The cloud provider's firewall or incoming traffic attenuator will search for this content and trigger a dedicated action upon detection.

In some embodiments, the exemplary tracing flag identifier 510 comprises a value placed in one or more fields of a header of the response packet to the potential attacker, a value that encapsulates a response, a value generated by the session-based attack detection process 300 and the session-based attack response process 400 of the cloud provider based on a unique number generator seed, and a satisfaction of one or more predefined response property rules (e.g., packet size is divisible by a predefined integer). When the tracing flag identifier 510 is based on a unique number generator seed, for example, the session-based attack detection process 300 of the attackee environment 150 and the session-based attack response process 400 of the cloud provider can now generate the same numbers, and the cloud provider will search for these numbers.

In one or more embodiments, there are a number of implementation options for injecting the tracing flag identifier 510 into responses 500:

1. the response 500 can include a new HTTP header and a randomly-generated value, as shown in FIG. 5;
2. the response 500 can also include an optional dedicated HTTP status code for the response 500 to help the firewall/gateway 125 to more quickly detect the tracing flag identifier 510 (the status code typically appears first in the HTTP packet) (the actual tracing flag identifier 510 to return to originator will be added as additional information in the headers);
3. the response 500 can encapsulate the "real response" for the originator (the response the cloud provider intercepts will contain all special data and information and the cloud provider will unwrap the encapsulated response as part of removing the tracing flag identifier, and send the tracing flag identifier to the originator; it is noted that the tracing flag identifier in this example may be much larger than the tracing flag identifier 510 depicted in FIG. 5; in some embodiments, encapsulating the real response means that the tracing flag identifier is larger, such as the whole outer packet, and the real data is, for example, in the payload (body) of the outer packer); and
4. the tracing flag identifier 510 can be encoded directly into "standard" HTTP headers, such as the Modified Date field (this will help, for example, in mitigating counter-attacks: malicious proxies or gateways that know about the disclosed solution and filter out the injected tracing flag identifier 510).

While the above examples have been illustrated in the context of the exemplary text-based HTTP protocol, they can be adapted for injecting into TCP protocol responses, as would be apparent to a person of ordinary skill in the art.

Cyber Cooperation API

In one or more embodiments, cloud providers employ a new API to allow better cooperation and communication with their customers (e.g., attackee environment 150), users and other cyberattack fighting organizations. Using this API, the disclosed tracing mechanism can notify the cloud provider about a suspected attack.

In some embodiments, the exemplary API call will comprise a list of suspected source IP addresses and the forensic information added to responses to those originating IPs in the previous step. The cloud provider will then start searching for forensic evidence at the incoming traffic modulator (e.g., firewall 125).

In at least one embodiment, the exemplary API call will comprise information about the response packets that are being delayed and include tracing flag identifiers 510. For each response, the API call will include:

a session ID, attack type ID, and details about the system calling the API ("the attackee");
source and target IP addresses of the original request (a response packet will have these roles will be reversed);
timestamp in which the request arrived at the session-based attack detection process 300;
amount of delay added to the response;
value of injected tracing flag identifier 510;
injection method type (e.g. a "Response-tag" HTTP header as described above with respect to FIG. 5); and
possible next action requests (e.g., mitigation steps).

In some embodiments, the cloud provider will retain the information from the exemplary API in a lookup database, and configure its firewall 125 to search for packets with the injected tracing flag identifier 510.

The exemplary API is optionally called multiple times, after each group of suspected attack requests are delayed. The API should be responsive (e.g., return quickly), as the system will delay the response packets until the cloud provider has acknowledged that the cloud provider is ready to search for the injected tracing flag identifier 510.

If an attacker disconnects the HTTP/TCP session, e.g., after suspecting delays are caused by the disclosed session-based attack detection system trying to detect the attacker, the disconnection pattern can also be notified to the cloud provider via the API. The cloud provider can search for the disconnection pattern in order to identify the attacker.

In some embodiments, the disclosed tracing mechanism techniques for analyzing session-based attacks improve the ability to detect and monitor potential session-based attacks, such as FaaS attacks.

Among other benefits, the disclosed session-based attack detection techniques improve the resiliency of attackees to session-based attacks, without significantly impairing the latency of expected responses.

One or more embodiments of the disclosure provide improved methods, apparatus and computer program products for using a tracing mechanism to analyze session-based attacks. The foregoing applications and associated embodiments should be considered as illustrative only, and numerous other embodiments can be configured using the techniques disclosed herein, in a wide variety of different applications.

It should also be understood that the disclosed session-based attack detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for detecting session-based attacks may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based session-based attack detection engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based session-based attack detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
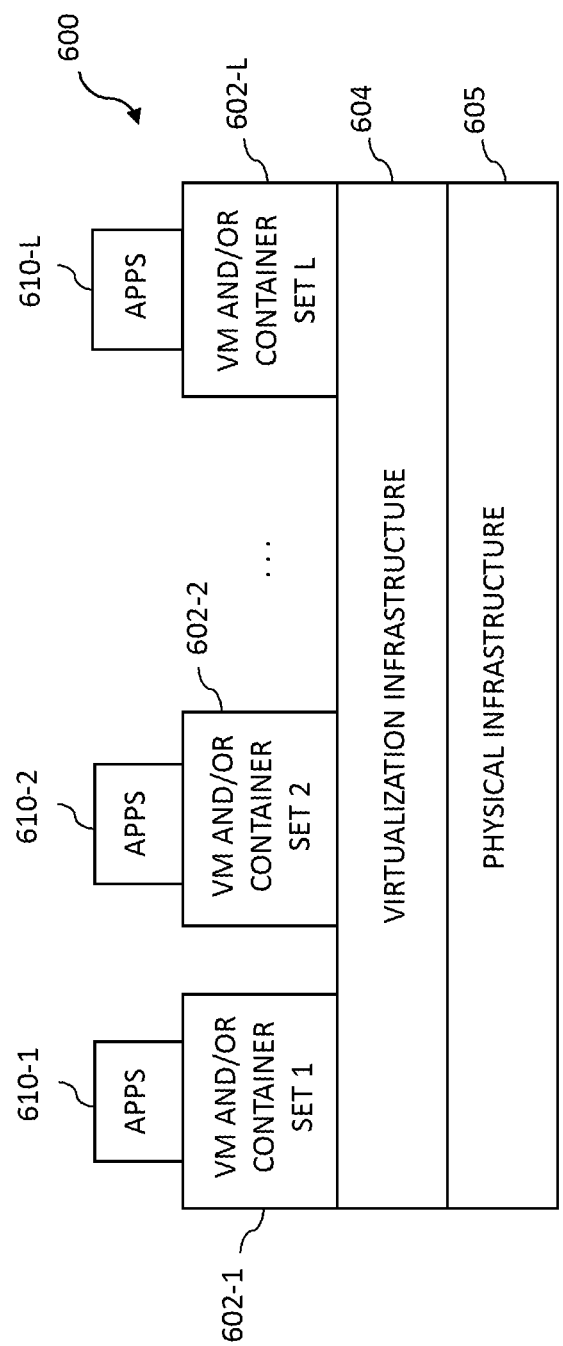
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the session-based attack detector 300 of FIG. 3. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide session-based attack detection functionality of the type described above for one or more processes running on a given one of the VMs. For example, each of the VMs can implement session-based attack detection control logic and associated session-based attack detection functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide session-based attack detection functionality of the type described above for one or more processes running on different ones of the containers. For example, a container host device supporting multiple containers of one or more container sets can implement one or more instances of session-based attack detection control logic and associated session-based attack monitoring for use in detecting session-based attacks.

As is apparent from the above, one or more of the processing modules or other components of the exemplary session-based attack processing system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments.

A given such article of manufacture may comprise, for example, a storage array, a storage disk or an integrated circuit containing RAM (random access memory), ROM (read only memory) or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
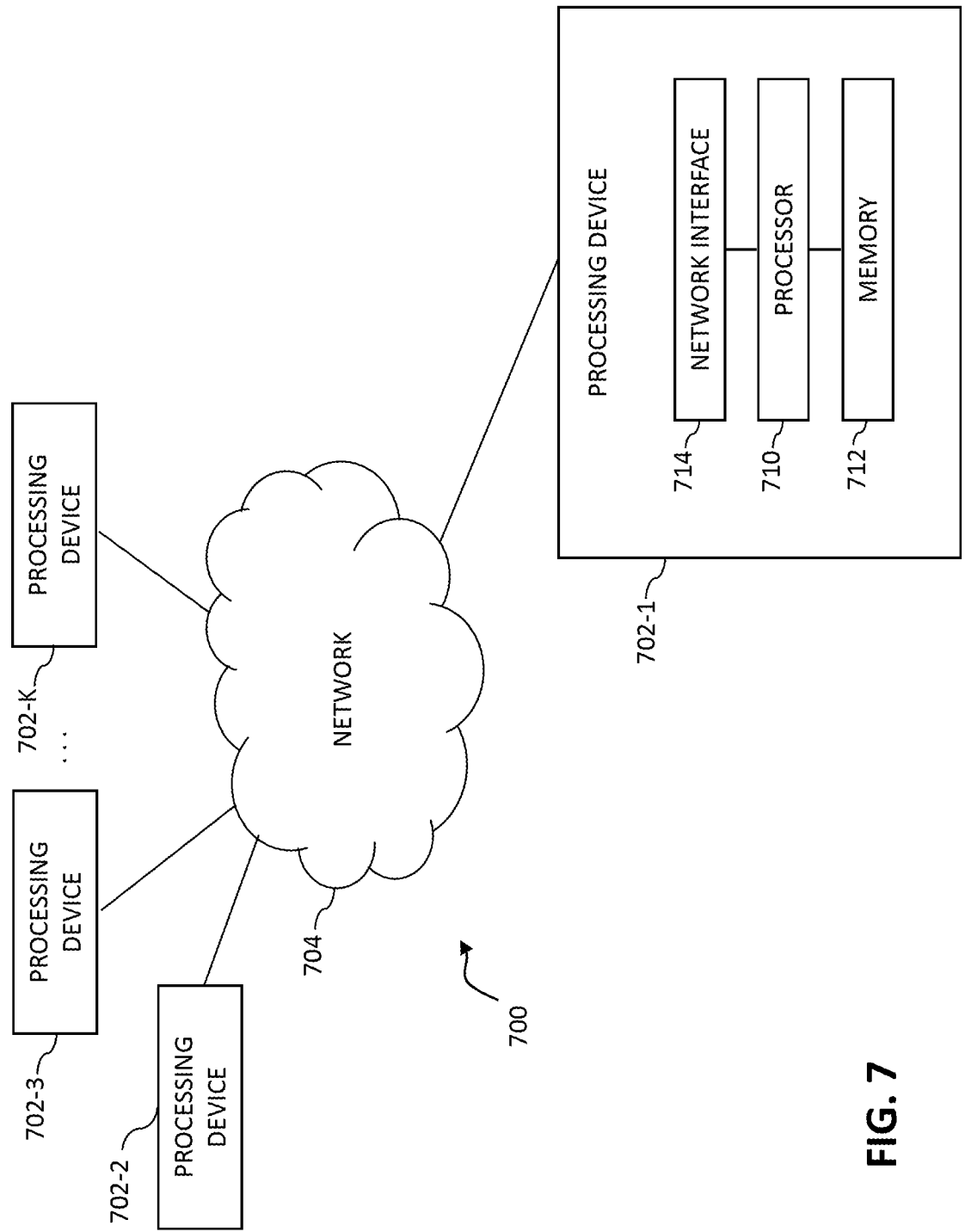
FIG. 7 illustrates another exemplary processing platform that may be used to implement at least a portion of one or more embodiments of the disclosure.

Multiple elements of system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   detecting a potential attack associated with a session from a potential attacker based on one or more predefined anomaly detection criteria;
   adding, using at least one processing device, a tracing flag identifier to at least one response packet;
   sending, using the at least one processing device, a notification to at least one cloud provider of the potential attack, wherein the notification comprises the tracing flag identifier; and
   sending the at least one response packet to the potential attacker,
   wherein, in response to receiving the at least one response packet with said tracing flag identifier, the at least one cloud provider performs the following steps:
   determine a source of the potential attack based on a destination of the at least one response packet;
   forward the at least one response packet to the potential attacker based on the destination of the at least one response packet; and
   monitor the determined source to evaluate the potential attack.

2. The method of claim 1, further comprising the step of identifying a potential source of the potential attack using a list of suspected Internet Protocol addresses.

3. The method of claim 1, further comprising the step of identifying one or more cloud providers associated with the potential attack based on an originating Internet Protocol address of the session.

4. The method of claim 1, wherein the step of sending the at least one response packet to the potential attacker is delayed one or more of by a predefined time duration and until said at least one cloud provider has acknowledged receipt of the notification.

5. The method of claim 1, wherein the notification is sent to the at least one cloud provider using an application programming interface.

6. The method of claim 1, wherein the tracing flag identifier comprises one or more of a value placed in one or more fields of a header of the at least one response packet to the potential attacker, a value that encapsulates a response, a value generated by the at least one processing device and the at least one cloud provider based on a number generator seed, and a satisfaction of one or more predefined response property rules.

7. The method of claim 1, further comprising the step of performing one or more predefined mitigation actions for a detected attack.

8. The method of claim 1, wherein, in response to receiving the at least one response packet with said tracing flag identifier, the at least one cloud provider performs the following additional step: remove the tracing flag identifier from the at least one response packet.

9. The method of claim 1, wherein the notification further comprises one or more of an identifier of the session and an identifier of a potential attackee.

10. The method of claim 9, wherein the following steps performed by the at least one cloud provider in response to receiving the at least one response packet with said tracing flag identifier further comprise the step of determining the identifier of the corresponding session based on the tracing flag identifier.

11. A computer program product, comprising a non-transitory machine-readable storage medium having encoded therein executable code of one or more software programs, wherein the one or more software programs when executed by at least one processing device perform the following steps:
- detecting a potential attack associated with a session from a potential attacker based on one or more predefined anomaly detection criteria;
- adding a tracing flag identifier to at least one response packet;
- sending a notification to at least one cloud provider of the potential attack, wherein the notification comprises the tracing flag identifier; and
- sending the at least one response packet to the potential attacker,
- wherein, in response to receiving the at least one response packet with said tracing flag identifier, the at least one cloud provider performs the following steps:
- determine a source of the potential attack based on a destination of the at least one response packet;
- forward the at least one response packet to the potential attacker based on the destination of the at least one response packet; and
- monitor the determined source to evaluate the potential attack.

12. The computer program product of claim 11, further comprising the step of identify a potential source of the potential attack using a list of suspected Internet Protocol addresses.

13. The computer program product of claim 11, further comprising the step of identifying one or more cloud providers associated with the potential attack based on an originating Internet Protocol address of the session.

14. The computer program product of claim 11, wherein the step of sending the at least one response packet to the potential attacker is delayed one or more of by a predefined time duration and until said at least one cloud provider has acknowledged receipt of the notification.

15. The computer program product of claim 11, wherein the notification is sent to the at least one cloud provider using an application programming interface.

16. An apparatus, comprising:
- a memory; and
- at least one processing device, coupled to the memory, operative to implement the following steps:
- detecting a potential attack associated with a session from a potential attacker based on one or more predefined anomaly detection criteria;
- adding a tracing flag identifier to at least one response packet;
- sending a notification to at least one cloud provider of the potential attack, wherein the notification comprises the tracing flag identifier; and
- sending the at least one response packet to the potential attacker,
- wherein, in response to receiving the at least one response packet with said tracing flag identifier, the at least one cloud provider performs the following steps:
- determine a source of the potential attack based on a destination of the at least one response packet;
- forward the at least one response packet to the potential attacker based on the destination of the at least one response packet; and
- monitor the determined source to evaluate the potential attack.

17. The apparatus of claim 16, further comprising the step of identify a potential source of the potential attack using a list of suspected Internet Protocol addresses.

18. The apparatus of claim 16, further comprising the step of identifying one or more cloud providers associated with the potential attack based on an originating Internet Protocol address of the session.

19. The apparatus of claim 16, wherein the step of sending the at least one response packet to the potential attacker is delayed one or more of by a predefined time duration and until said at least one cloud provider has acknowledged receipt of the notification.

20. The apparatus of claim 16, wherein the notification is sent to the at least one cloud provider using an application programming interface.

* * * * *